July 13, 1965   R. M. JAMISON ETAL   3,194,544
AIR WASHER
Filed Sept. 15, 1961

INVENTORS
ROBERT M. JAMISON
ORLAN M. ARNOLD
BY
*Curtis, Morris & Safford*
ATTORNEYS United States Patent Office 3,194,544
Patented July 13, 1965

3,194,544
AIR WASHER
Robert M. Jamison, Detroit, and Orlan M. Arnold, Grosse
Pointe Park, Mich., assignors to Ajem Laboratories,
Inc., Livonia, Mich.
Filed Sept. 15, 1961, Ser. No. 138,472
13 Claims. (Cl. 261—24)

This invention relates to air washers and the like and to apparatus useful therein for generating spray patterns of high velocity liquid droplets.

The present invention is well adapted for efficient dust and fume collections and may be regarded as an improvement on air washers of the type shown, for example, in the Umbricht Patent 2,789,866. These have come into wide and successful use, not only for air washing in the strict sense, but also in gas-liquid absorption or reaction processing equipment, particle collection apparatus, etc.

Nevertheless, certain deficiencies and limitations have appeared, among which may be mentioned:

(1) Non-uniform vertical distribution of the feed liquid to the spray generator elements so that a part of the elements is overloaded with more liquid than can be efficiently broken into high velocity droplets which make up the spray and/or a part of the elements is unused or not used to full advantage.

(2) Insufficient depth of the spray pattern generated, so that the air or other gases passing through it are insufficiently contacted with the liquid.

(3) Inability to uniformly distribute a sufficient volume of the liquid into the spray generator rotor.

(4) Development of "voids" in the spray pattern, i.e., zones in which there is little or no distribution of the high velocity droplets, so that some of the gases to be treated can pass through the spray without sufficient contact with the droplets.

(5) Short-circuiting of some of the air through the central area of the spray generator where it is not subjected to the high velocity droplets. Such air flow also has impaired the formation of the desired efficient and uniform spray pattern.

(6) Failure of bearings at the lower end of the spray generator due to effects of the liquid and contaminated air to which they have been exposed.

(7) Failure of pumps and pumping systems to accommodate the various operating conditions and demands without clogging or affecting uniformity of delivery.

It is an object of the present invention to avoid more effectively such deficiencies and limitations, and to provide an improved method and apparatus for creating and controlling a deeper spray pattern.

It has been found that better results are attained with higher speed operation and higher centrifugal force in the spray but difficulty is experienced in getting the depth of spray pattern necessary for the best results. Even with well designed vane type spray generators, the spray coming from the vanes is found to concentrate in a small vertical zone, e.g. in the lower few inches of a vane type rotor with 8" or 10" high vanes.

A basic problem in the design of such air washers has been the generation of a deep, uniformly concentrated spray pattern of high velocity drops, within a scrubbing zone through which the gas flow is directed. In the apparatus particularly referred to above, these spray patterns have been generated by rapidly rotating circumferentially arranged elements which strike, break up, disperse, and peripherally project, a liquid distributed to it as a stream and thrown out as a spray of high velocity droplets. These droplets in passing through a gas sweep out and entrain the various contaminants from the air, and/or by virtue of the greatly increased surface

2 area, absorb or react with the gas. Efficiency is determined by (1) the size and velocity of the individual droplets and (2) the depth, uniformity, and concentration of the resulting spray pattern.

Liquid feed devices heretofore employed to supply the liquid feed stream have not provided a perfectly regular and uniform distribution of the liquid along the entire altitude of the dispersing structures, whereby a non-uniform spray pattern of less than maximum depth has resulted.

One object of this invention is, therefore, to provide spray-generating apparatus for generating a deep, uniform and highly concentrated spray pattern of high velocity liquid droplets.

Another object of this invention is to provide a spray-generating apparatus which will increase the efficiency of an air washer.

Another object of this invention is to provide a spray-generating apparatus which may be readily incorporated with air washers presently in commercial use.

We have found that the ingress of air into an area of the spray generating device where the spray pattern is not yet formed is undesirable as (1) it is likely to bypass around the scrubbing area unwashed by the liquid droplets, and (2) it deleteriously affects the uniformity of distribution of the washing liquid through the feed port and over the full height of the dispersing structures.

In accordance with the principle of this invention, therefore, provision is made whereby the uniformity of distribution of the washing liquid is effected within the spray generator by a distributor designed with a view to the dimensions of the spray generator, and the volume and pressure of the liquid, to distribute the liquid uniformly over the effective height of the spray generating impellers. We have found that this is best accomplished by a rapidly rotating conical deflector with its nose or apex on the axis of a feed duct supplying liquid under substantial pressure, and that this is most effective if the apex angle is between 30° and 120° (15°–60° to the axis of rotation and of the incoming flow and 75°–30° to the discharge direction into the scrubbing zone). Most advantageous results are found with apex angle of about 60°. When this angle is changed, it alters the limiting cones (the angular directions) within which the liquid feed is thrown onto the vanes and their height and radial relation should therefore be adjusted to bring the height of the inner edge of the vanes where they cut their own height between the limiting cones of the liquid feed stream. Such adjustment can be provided in the attachment of the deflector cone, but we prefer to use a deflector designed for the particular situation and replace it with another if conditions are changed.

Although there is advantage in having the deflector rotate, that is not essential to this invention.

In one illustrative embodiment of this invention a rotating spray generator has a dispersing structure which comprises a plurality of circumferentially spaced impellers or vanes, and a feed port centrally located with respect to the impellers. However, instead of establishing a distributing stream of the liquid below an open port and projecting it through the port to the impellers, a feed pipe extends to and is substantially tight with the feed port with clearance sufficient to avoid impeding of the spray generator but close enough so that by-passing air through the spray generator, and thus avoiding the scrubbing zone, is virtually eliminated.

To effect a regular distribution of the washing liquid along the entire altitude of the impeller, a rotating conical baffle is mounted within the distributor coaxial with the inlet to serve as distributor for the liquid feed stream.

The apex angle of this conical baffle is selected, and the baffle so positioned that the washing liquid is deflected in a conical stream or spaced streamlets and/or coarse drops, and is regularly distributed along the entire altitude of the impeller. This conical distributor may be fluted, or vanes provided on its surface, whereby the liquid is deflected in a spoke-like manner and toward the impellers.

A further appreciation of this invention will be conveyed by the following detailed description taken in conjunction with the accompanying drawings, wherein.

Figure 1:
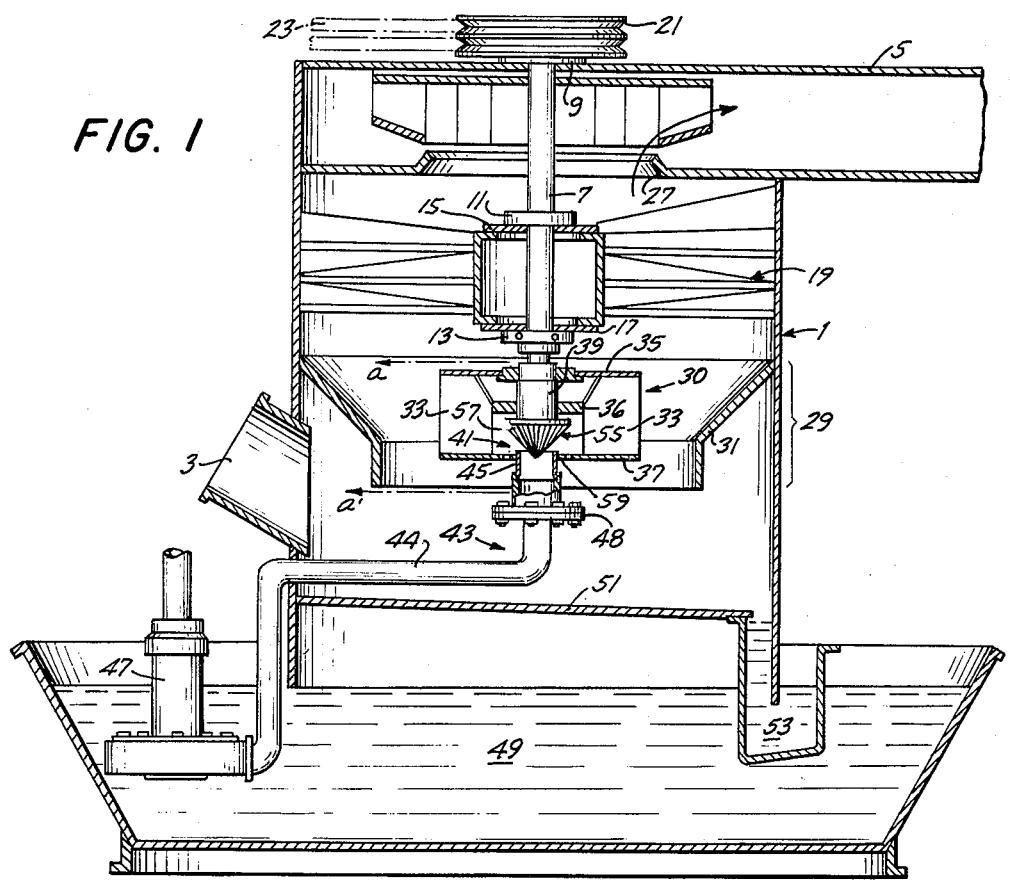
FIGURE 1 is a view in axial sectional view of an air washer illustrating one embodiment of a spray-generating apparatus in accordance with this invention and having the fluted conical baffle.

Shown in FIGURE 1 is a wet-type dust and fume collector apparatus incorporating the principles of this invention. It includes an upright, substantially cylindrical housing 1 having an input duct 3 for contaminated air and an output duct 5 for washed air, i.e., cleaned of contaminants or reacted or otherwise contacted with the gas.

A vertical drive shaft 7 is coaxially supported within the housing 1, e.g., by bearings 9, 11 and 13. The bearing 9 is mounted on the roof structure of housing 1, the support bearings 11 and 13 rest upon the end plates 15 and 17, respectively, of a central hub in a moisture eliminator comprising radial, canted blades or baffles 19. This eliminator assembly is secured to the housing 1 and rigidly designed so as strongly to support bearings 15 and 17.

The shaft 7, thus supported, is rotated by a multiple V-belt sheave 21 which is driven by a motor, not shown, through the V-belts 23. At the top interior of the housing 1, a centrifugal blower 25 is fixed on the shaft 7 and aligned with the output duct 5.

Disposed immediately below the moisture eliminator 19 is the scrubbing zone, generally indicated by 29. More particularly, the scrubbing zone 29 is that portion of the space within the housing 1 into which high velocity liquid droplets are projected by the spray-generating apparatus of this invention. The bottom of this zone is defined by the input baffle 31 which serves to distribute from the input duct 3 the contaminated air around the spray-generating apparatus 30.

The fan 25, when rotated, draws contaminated air or other feed gas from the input duct 3 upward through the mouth of the input baffle 31 and through the scrubbing area 29 where it is washed, and thence up through the moisture-eliminator 19, the throat of the output baffle 27 and blower 25, and outwardly along the output duct 5.

Figure 2:
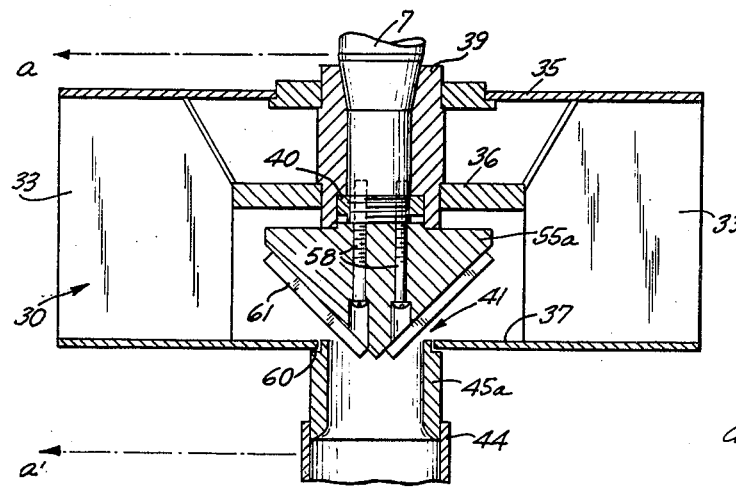
FIGURE 2 is a fragmentary axial sectional view on a larger scale of an air washer generally similar to and taken along the line a–a' of FIGURE 1 but illustrating modifications in the structure of a spray-generating apparatus, in accordance with this invention, wherein small vanes are provided on the surface of the conical deflector.

The spray-generator 30 is supported within the scrubbing area 29 on the shaft 7. As illustrated in FIGURES 1 and 2, the spray-generator comprises a plurality of impeller vanes 33 supported in radial position, with respect to the extended axis of shaft 7, by the annular supports 35, 36 and 37.

The annular supports 35 and 36, connected, respectively, to the top and interior edges of the impeller vanes 33, are fixedly mounted on a hub structure 39 keyed to the shaft 7 by a locking nut 40. The annular support 37 is secured to the lower edges of the impeller vanes 33 holding them positioned relative to each other and closing the bottom of the spray generator, substantially fitting the feed port 41 (see FIG. 2).

The liquid to be dispersed as a spray from the feed conduit 43 is directed within the spray-generating apparatus 30. The feed conduit 43 includes a large diameter pipe 44 connected to a high pressure, high capacity pump 47 which may be of the type disclosed in the copending application of Emil Umbricht Serial No. 143,355, filed October 6, 1961. The pump 47 is immersed in a reservoir 49 situated below the inclined floor 51 of the housing 1. As shown, the large diameter pipe 44 passes through the wall of housing 1 and at its upper end is axially aligned with the extended axis of the rotating shaft 7. Telescoped within the mouth of large diameter pipe 44 is a tubular coupling member 45 designed to make a substantially air tight connection with the plate 37 to extend the duct 43 to the feed port 41 of the spray-generating apparatus.

If desired, flanges 48 or other readily detachable joint may be provided to facilitate removal and replacement of the pipe 43.

The washing liquid carrying contaminants (if any) removed from the air collects on, and runs down, the inner wall of housing 1 and the input baffle 31 and falls down through the upward flowing air onto floor 51, and flows along the inclined floor 51 to trough 53 which leads it into the reservoir 49. Within the trough 53, or between it and reservoir 49, the liquid may be clarified, screened or filtered, for example, by filtering apparatus, e.g., of the type shown in the Emil Umbricht Patent 2,833,417 or in the Pashaian et al. application, Serial No. 125,597, filed March 9, 1961, and now abandoned, which may be provided at the end of 53. The filtered washing liquid is thereupon returned to the reservoir 49 for recirculation and reuse.

To insure the generation of a spray pattern of full depth, in accordance with the principles of this invention, washing liquid directed along the pipe 43 and within the spray-generating apparatus 30 is first distributed over the full height of impeller elements 33 by the conical deflector 55. The stream of liquid emerging from the end 45 of the inlet pipe is diverted radially thereby and into the zone of the spray generating rotor 30, where it encounters the rapidly moving impellers and is broken up and dispersed and accelerated outwardly by each impeller vane and projected therefrom as high velocity droplets, uniformly along the full length of the exterior edge of each impeller 33.

The conical deflector 55 is secured on the lower extremity of the rotating shaft 7 by the screws 58 (see FIG. 2) so as to be supported centrally between the impeller vanes 33 and coaxially with the tubular member 45. Due to the shape of the conical distributor 55 and its position within the spray-generating apparatus 30 and the vanes or grooves, if used, on the distributor, the full volume of liquid supplied from duct 43 is distributed over the altitude of the impellers 33.

The deflector 55, as shown in FIGURE 1, is of a pointed, outwardly flaring form advantageously conical or substantially approaching that of a cone, and, in FIGURE 1, is shown fluted, whereby the washing liquid is distributed in spoke-like streams to the several impellers 33. The flutes 57 may distribute the feed liquid over the full altitude of impeller 33. The outward acceleration of the liquid across the full height of the impeller vanes 33 provides a substantially uniform spray pattern of desired depth, which extends across the scrubbing area 29.

To maintain this liquid feed pattern,, as well as to prevent contaminated air being sucked up through the spray-generating apparatus, by-passing the scrubbing area 29, the feed port 41 in FIGURE 1 is effectively sealed to support plate 37 by a flange 59 positioned on the tubular member 45.

The flange 59 is dimensioned so as not to impede the rotation of the spray-generator 30 but, at the same time, to be closely spaced with the plate 37 around the feed port 41. Thus the contaminated air in the lower part of the housing 1 is substantially prevented from short circuiting through the central area of the spray generator to the top of the spray pattern unwashed, and also from deleteriously affecting the desired feed pattern of the washing liquid onto the impeller vanes 33.

In the spray-generating apparatus 30 of FIGURE 2, the flange 59 is eliminated and the tubular extension 45A is provided with a shoulder-like recess 60 over which the lower annular support 37 is positioned. In this instance, the conical distributor 55A, rather than being fluted, is provided with a series of small vanes 61 on its surface to effect circumferential distribution of the liquid.

Figure 3:
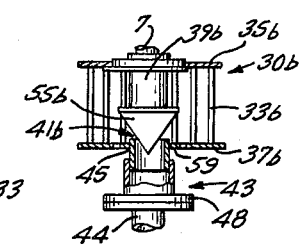
FIGURE 3 is a view partly in elevation and partly in axial section of a rod cage type distributor embodying this invention.

In FIGURE 1, the impellers are shown as vanes 33, but our invention is applicable likewise to spray generators in which the impellers are rods, etc., as in our earlier patents. This is illustrated in FIGURE 3 wherein a rod cage-type rotor is shown comprising a number of spaced, vertical rods 33b secured at their extremities by annular supports 35b and 37b, respectively. The annular support 35b is mounted on the hub structure 39b keyed to the shaft 7. The tubular section 45 of the feed conduit 43 extends through the aperture 41b of the annular support 37b and within the cage-rod distributor. A conical deflector 55b is supported on the shaft 7 along the extended axis of the tubular section 45 of the conduit 43. In the instant embodiment, the rotating deflector cone 55b is provided with a smooth surface whereby the washing liquid is distributed over the entire height of the impeller rods 33b. As shown, the conical distributor 55b extends into the feed port 41b, thus reducing the effective cross-sectional area of the aperture.

FIGURE 3 shows a fragment of the structure shown in FIGURE 1, the remainder of the structure being identical with that of FIGURE 1. In this structure a cage-type spray generator 30b is used having vertical rods 33b in lieu of the vanes 33 rigidly secured to the annular supports 35 and 37. Other corresponding parts shown are identified by reference characters corresponding to those shown in FIGURE 1.

In this specification we have shown and described a preferred embodiment of our invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

We claim:

1. In a liquid gas scrubbing apparatus, a housing for confining a flow of gas to be scrubbed with the liquid, means for moving gas to be scrubbed through said housing, a spray generator in said housing for filling a scrubbing zone therein with a driving rain of high velocity droplets and comprising a series of spaced impellers substantially cylindrically arranged, means to rotatably support said spray generator, means for rotating said spray generator at high velocity about its axis, a conduit for supplying liquid under pressure, a feed port in one end of said spray generator and substantially fitting the delivery end of said conduit, whereby said liquid is received within the interior of said spray generator without sucking in gas from said flow, generally cone-shaped deflecting means having vanes on its surface facing said feed port axially supported from and within said spray generator at said feed port for deflecting said liquid over substantially the full effective length of said impellers and the full circumference of their cylindrical arrangement, whereby said liquid is broken up by impact of said impellers, dispersed and projected outwardly as high velocity liquid droplets.

2. An apparatus as defined in claim 1 wherein said impellers are spaced vertical rods.

3. An apparatus as defined in claim 1 wherein said impellers are spaced vanes.

4. An apparatus as defined in claim 1 in which the deflecting means is substantially conical with its apex angle in the range 30–120°.

5. An apparatus as defined in claim 1 in which the deflecting means is substantially conical with its apex angle in the range 60–90°.

6. An apparatus as defined in claim 1 wherein said deflecting means extends into said feed port.

7. In a liquid gas scrubbing apparatus, a housing for confining a flow of gas to be scrubbed with the liquid, means for moving gas to be scrubbed through said housing, a spray generator in said housing for filling a scrubbing zone therein with a driving rain of high velocity droplets and comprising a series of spaced impellers substantially cylindrically arranged, means to support said spray generator, means for rotating said spray generator at high velocity about its axis, a conduit for supplying liquid under pressure, a feed port in one end of said spray generator and substantially fitting the delivery end of said conduit, said feed port being secured to said spray generator and having an outside diameter less than the inside diameter of the interfitting end of said conduit and being rotatable with respect thereto to prevent the ingress of gas with said liquid into said spray generator, generally cone-shaped deflecting means axially supported from and within said spray generator at said feed port for deflecting said liquid over substantially the full effective length of said impellers and the full circumference of their cylindrical arrangement, whereby said liquid is broken up by impact of said impellers, dispersed and projected outwardly as high velocity liquid droplets.

8. An apparatus as defined in claim 7 wherein said impellers are spaced vertical rods.

9. An apparatus as defined in claim 7 wherein said impellers are spaced vanes.

10. An apparatus as defined in claim 7 in which the deflecting means is substantially conical with its apex angle in the range 30–120°.

11. An apparatus as defined in claim 7 in which the deflecting means is substantially conical with its apex angle in the range 60–90°.

12. An apparatus as defined in claim 7 wherein said deflecting means extends into said feed port.

13. An apparatus as defined in claim 7 wherein said deflecting means has vanes on its surface facing said feed port.

References Cited by the Examiner

UNITED STATES PATENTS

| | | | |
|---|---|---|---|
| 1,560,527 | 11/25 | Bassler | 239—380 XR |
| 1,859,770 | 5/32 | Fleisher | 239—215 |
| 2,220,275 | 11/40 | Preston | 239—223 |
| 2,303,088 | 11/42 | Perkins | 239—215 |
| 2,428,292 | 9/47 | Queen | 239—215 |
| 2,527,015 | 10/50 | Lhota | 261—91 |
| 2,789,866 | 4/57 | Umbricht | 239—215 XR |

HARRY B. THORNTON, *Primary Examiner.*

HERBERT L. MARTIN, *Examiner.*